(12) United States Patent
Takeuchi et al.

(10) Patent No.: US 6,914,745 B2
(45) Date of Patent: Jul. 5, 2005

(54) HEAD MOVEMENT CONTROLLING BASED ON SERVO GENERATED SPEED CONTROL VALUES

(75) Inventors: Masayuki Takeuchi, Kamakura (JP); Yuzo Nakagawa, Hiratsuka (JP); Yukio Fukushima, Tokyo (JP); Tetsuo Ueda, Sagamihara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 274 days.

(21) Appl. No.: 10/222,049

(22) Filed: Aug. 16, 2002

(65) Prior Publication Data

US 2003/0035240 A1 Feb. 20, 2003

(30) Foreign Application Priority Data

Aug. 16, 2001 (JP) ........................................ 2001-247394

(51) Int. Cl.[7] .............................................. G11B 5/596
(52) U.S. Cl. ...................................................... 360/78.06
(58) Field of Search ........................... 360/78.06, 78.07, 360/73.03, 77.04, 77.05, 78.09, 75, 78.14, 78.04, 70; 310/13; 318/592, 127, 717; 369/44.28, 30.17, 44.36; 361/42; 702/56

(56) References Cited

U.S. PATENT DOCUMENTS

| | | | | |
|---|---|---|---|---|
| 4,480,279 A | * | 10/1984 | Hashimoto ................ | 360/78.07 |
| 4,795,928 A | * | 1/1989 | Suzuki et al. ................. | 310/13 |
| 4,888,536 A | * | 12/1989 | Sakai et al. ................. | 318/592 |
| 5,001,578 A | * | 3/1991 | Yamauchi ................ | 360/73.03 |
| 5,023,733 A | * | 6/1991 | Koga et al. ............... | 360/77.04 |
| 5,184,257 A | * | 2/1993 | Koga et al. ............... | 360/77.05 |
| 5,285,435 A | * | 2/1994 | Takasago ................. | 369/44.28 |
| 5,307,439 A | * | 4/1994 | Enami ........................ | 388/811 |
| 5,422,867 A | * | 6/1995 | Hamaguchi et al. ..... | 369/30.17 |
| 5,781,365 A | * | 7/1998 | Romano et al. ......... | 360/78.06 |
| 6,038,115 A | * | 3/2000 | Kleemeier et al. ............ | 361/42 |
| 6,101,453 A | * | 8/2000 | Suwa et al. ................... | 702/56 |
| 6,115,205 A | * | 9/2000 | Waugh et al. ........... | 360/78.06 |
| 6,229,663 B1 | * | 5/2001 | Yoneda et al. ................ | 360/75 |
| 6,236,527 B1 | * | 5/2001 | Uchiike et al. ............... | 360/75 |
| 6,256,163 B1 | * | 7/2001 | Schmidt et al. .......... | 360/78.09 |
| 6,271,636 B1 | * | 8/2001 | Galloway .................... | 318/127 |
| 6,301,207 B1 | * | 10/2001 | Isokawa et al. .......... | 369/44.36 |
| 6,353,510 B2 | * | 3/2002 | Drouin ........................ | 360/75 |
| 6,496,319 B1 | * | 12/2002 | Kusumoto et al. ............ | 360/75 |
| 6,594,105 B1 | * | 7/2003 | Brittner ................... | 360/78.06 |
| 6,614,617 B1 | * | 9/2003 | Galloway ................ | 360/78.06 |
| 6,657,811 B1 | * | 12/2003 | Codilian .................. | 360/78.06 |
| 6,661,598 B2 | * | 12/2003 | Kusumoto et al. ............ | 360/75 |
| 6,680,598 B2 | * | 1/2004 | Galbiati et al. ............. | 318/717 |
| 6,690,537 B2 | * | 2/2004 | Kagami et al. .......... | 360/78.06 |
| 6,697,207 B2 | * | 2/2004 | Harmer ....................... | 360/75 |
| 6,724,564 | * | 4/2004 | Codilian et al. ......... | 360/78.07 |
| 6,735,040 | * | 5/2004 | Galloway et al. ........ | 360/78.06 |

FOREIGN PATENT DOCUMENTS

JP 08-077734 3/1996 ........... G11B/21/08

* cited by examiner

*Primary Examiner*—David Hudspeth
*Assistant Examiner*—Fred F. Tzeng
(74) *Attorney, Agent, or Firm*—Ronald B. Feece; Lewis L. Nunnelley

(57) ABSTRACT

The hard disk drive comprises: a magnetic disk 2 having servo information stored; magnetic heads 4 seeking on the magnetic disk 2 and staying at a predetermined position to read or write data; a voice coil motor 6 moving the magnetic heads 4 to the predetermined position of the magnetic disk 2; a position controller supplying a driving current to the voice coil motor 6 based on the servo information read by the magnetic heads 4. The position controller includes: a CPU 12 outputting a speed control value based on the servo information; a DAC 7 and a VCM driver 8 converting the speed control value into the driving current; and a controller 10 limiting a driving speed of the voice coil motor 6 in a case that an output timing of the speed control value is shifted.

9 Claims, 3 Drawing Sheets

HEAD MOVEMENT CONTROLLING BASED ON SERVO GENERATED SPEED CONTROL VALUES

BACKGROUND OF THE INVENTION

1. Field of the Invention

The present invention relates to a data storing and reproducing device represented by a hard disk drive, and specifically to a position control of a head for reading or writing data in the data storing and reproducing device.

2. Background of the Invention

A hard disk drive is one of the most prevalent external storage of a computer. A magnetic disk as a storage medium of the hard disk drive, as is generally known, has a sector as a minimum storage unit, which is defined by further radially dividing a track obtained by dividing a surface of the disk, which is shaped like the annual rings of a tree. A line recording density is made higher near the outer circumference of the magnetic disk. In a zoned bit recording method, which is mainly used as a data storing method of the magnetic disk currently, all the tracks are divided into some zones, and each of the zones has a constant line recording density. Consequently, since a sector size is typically 512 bytes, the track closer to the outer circumference of the magnetic disk has a larger number of sectors.

The hard disk drive includes a magnetic head for reading data stored in the magnetic disk, and for writing data in the magnetic disk. The magnetic head is attached to an actuator mechanism the movement of which is controlled by a voice coil motor (VCM).

At the time of reading or writing data with the magnetic head, the actuator mechanism is driven to move and position the magnetic head to a predetermined track. Such moving and positioning operation is called seek. The magnetic head is allowed to seek to the predetermined track using servo information stored in the magnetic disk as a clue.

The track of the magnetic disk is sectioned into a plurality of sectors as described above. Each of the sectors includes a data area for storing data and a servo area for storing the servo information. In the servo area, track identification information and a burst pattern are stored as the servo information. The track identification information is information indicating a track address of each data track. The track identification information is read by the magnetic head to enable determination of the track position where the magnetic head is currently positioned. The burst pattern includes areas arranged at a constant interval in a radial direction of the disk, each area storing a signal, and is constituted of a plurality of signal storage area arrays, each having the signal storage areas of different phases. A displacement amount of the magnetic head from the data track can be determined based on the signal outputted from the burst pattern. In data reading/writing of the magnetic disk, position control is carried out in the following manner. While the magnetic disk is rotated, the position of the magnetic head is checked by use of the servo information. If the displacement occurs, the actuator mechanism, that is, the magnetic head, is driven to correct the displacement. In order to position the head at the center of the track, the head has been heretofore positioned to the predetermined track by monitoring a position error signal (PES) value obtained from the burst pattern.

However, abnormal servo information, a noise current, a defect in a servo logic circuit, a software bug, or the like sometimes makes the head movement control impossible. In such a case, the head is sometimes turned into a so-called runaway state. Then, for example, the magnetic head and the magnetic disk collide with each other to be damaged. As means for preventing such runaway of the head, there are mechanical mechanisms such as a crash stop and a latch. However, since a driving current of the VCM becomes larger as the hard disk drive comes to have higher performance, the speed of the actuator at the runaway state overpasses a limit of the mechanical mechanism. In other words, there is no effective means for preventing the runaway of the head as a mechanical mechanism.

Japanese Patent Laid-Open No. 8(1996)-77734 discloses a data storing and reproducing device capable of reducing a moving speed of the magnetic head in the case that a ungeneration period of a sector pulse exceeds an allowable range. The data storing and reproducing device is effective for the runaway of the magnetic head caused by ungeneration of the sector pulse, but there are various kinds of factors causing the runaway of the magnetic head in addition to the ungeneration of the sector pulse.

SUMMARY OF THE INVENTION

Accordingly, an object of the present invention is to provide a data storing and reproducing device capable of coping with the various kinds of factors causing the runaway of the magnetic head.

Typically, the speed control value generated based on the servo information is converted to an analog signal (voltage signal) in a digital/analog converter (DAC), and then the analog signal is converted to a driving current of the voice coil motor. The voice coil motor is driven by being supplied with the driving current. The speed control value for setting a moving speed of the actuator, that is, a moving speed of the head is generated and outputted at a predetermined interval based on the servo information. However, when the head is in a runaway state, the speed control value is not generated at the predetermined interval. Accordingly, in the present invention, the generation of the speed control value is monitored, and when the speed control value is not generated at the predetermined interval, the head is considered to be in the runaway state, and a measure is taken for protecting the head from the runaway.

A hard disk drive according to an embodiment of the present invention includes a magnetic disk having servo information stored; a magnetic head seeking on the magnetic disk and staying at a predetermined position to read or write data; a voice coil motor moving the magnetic head to the predetermined position of the magnetic disk; a position controller supplying a driving current to the voice coil motor based on the servo information read by the magnetic head; and a ramp holding the magnetic head at a time of non-operation of the hard disk drive, the ramp being disposed outside the magnetic disk.

The position controller of the hard disk drive according to the present invention includes: an output unit outputting a speed control value based on the servo information; a converter converting the speed control value into the driving current; a monitoring unit monitoring an output timing of the speed control value; and a driving speed controller limiting a driving speed of the voice coil motor in a case that the output timing of the speed control value is shifted by an amount not less than a predetermined amount.

In the hard disk drive according to the present invention, the driving speed of the voice coil motor can be limited when abnormality is caused in the output timing of the speed control value, so that a situation where the runaway of the magnetic head is continued can be avoided. Furthermore, in the present invention, the speed control value typically generated and outputted by a CPU is used as a factor for judging the occurrence of the runaway. Since the speed control value is generated and outputted based on the servo information as described above, abnormality of the servo information, for example, ungeneration of the sector pulse, causes abnormality in a generation cycle of the speed control value. Moreover, the abnormality is also caused in the generation cycle of the speed control value by a noise current, a defect in the servo logic circuit, a software bug, or the like. Moreover, the noise current, the defect in the servo logic circuit, the software bug, or the like can cause the runaway of the magnetic head. Therefore, since the speed control value is used as a factor for judging the occurrence of the runaway, the present invention can effectively cope with various kinds of factors causing the runaway.

In the present invention, it is proposed that a short circuit is made in the voice coil motor as a method of limiting the driving speed of the voice coil motor. Specifically, the output portion of the voice coil motor is short-circuited to generate a large current, so that kinetic energy of the voice coil motor is instantaneously lowered. Hence, the speed of the magnetic head moved by the voice coil motor is reduced. Consequently, the driving speed controller of the present invention limits the driving speed of the voice coil motor by making a short circuit in the voice coil motor.

In the present invention, it is proposed that a brake current is supplied to the voice coil motor as a method for limiting the driving speed of the voice coil motor. The brake current is a driving current set to reduce the driving speed of the voice coil motor. The most typical brake current includes a driving current for moving the voice coil motor in an opposite direction to the moving direction at that time. When such a driving current is supplied to the voice coil motor, the driving speed thereof is reduced. Consequently, the driving speed controller of the present invention limits the driving speed of the voice coil motor by supplying the brake current thereto.

The moving speed of the magnetic head, in other words, the driving speed of the voice coil motor in the runaway state is extremely high, so that the operation thereof is sometimes difficult to control with the driving current. In the present invention, a short circuit is desirably first made in the voice coil motor, and then the brake current is supplied to the voice coil motor. For example, it is confirmed whether or not the driving speed of the voice coil motor becomes less than a predetermined value by making a short circuit in the voice coil motor. The predetermined value means a speed capable of properly controlling the voice coil motor. The driving speed of the voice coil motor can be recognized by measuring a voltage of an electromotive force generated by releasing the short circuit after once making the short circuit because the voltage is proportional to the driving speed of the voice coil motor. When the driving speed of the voice coil motor is turned out to reach the predetermined value or lower, the brake current is supplied. The hard disk drive of the present invention desirably takes the mode of making a short circuit in the voice coil motor and then supplying the brake current to the voice coil motor, but is not limited to such a mode.

In the hard disk drive of the present invention, the driving current can be supplied to the voice coil motor to move the magnetic head to the ramp when the driving speed of the voice coil motor becomes the predetermined speed or lower. In the case that the runaway is continued, the movement of the magnetic head to the ramp cannot be easily controlled because of the high speed thereof. In the present invention, the movement to the ramp is desirably carried out when the driving speed of the voice coil motor is limited and then becomes the predetermined speed or lower. The limitation of the driving speed involves the short-circuiting in the voice coil motor and/or the supply of the brake current.

In the foregoing, the description has been made for the present invention with regard to the hard disk drive. However, the present invention can be applied to a data storing and reproducing device in addition to the hard disk drive. Specifically, the present invention provides the data storing and reproducing device comprising: a storage medium storing data; a head performing data writing or reading for the storage medium; an actuator moving the head to a predetermined position of the storage medium; an output unit intermittently outputting a moving command to the actuator; and a detector detecting a generation interval of the speed control value.

The data storing and reproducing device of the present invention is provided with the detector detecting an output interval of the moving command represented by the speed control value. Therefore, when a new moving command is not outputted for a predetermined period, it can be judged that abnormality is caused in the output of the moving command, in other words, that the runaway is caused in the head.

Consequently, in the present invention, occurrence of the runaway of the head can be suppressed by including a controller, which controls the speed of the actuator to be reduced when the output interval of the moving command exceeds the predetermined value.

The controller can control the speed of the actuator to be reduced step-by-step. Moreover, the controller can control the actuator to move to a retracted position after the speed of the actuator is reduced to the predetermined speed. The retracted position is previously provided. For example, the retracted position is a load/unload ramp of the hard disk drive.

In the present invention, a head movement controller to be described below is provided for use in the above-described hard disk drive and data storing and reproducing device.

The head movement controller of the present invention controls movement of a head, which reads or writes data, on a storage medium based on servo information. The head movement controller includes: output means regularly outputting the speed control value for setting the moving speed of the head based on the servo information; detecting means detecting an output of the speed control value; and judgment means judging whether or not a generation interval of the speed control value exceeds a predetermined period based on a result of the detection by the detecting means. The head movement controller further includes control means changing a movement control of the head to a predetermined control in a case that the judgment means judges an output interval of the speed control value exceeds a predetermined period.

In the present invention, the predetermined control to which the movement control of the head is changed in the case that the judgment means judges an output interval of the speed control value exceeds the predetermined period is operated to protect the head, because the object thereof is to protect the head from the runaway. By protecting the head, crash can be suppressed between the head and the storage medium, so that the predetermined control serves as a protect operation for the storage medium. One of the concrete methods of protecting the head is reducing the moving speed of the head. The concept of the protect operation involves a retract of the head out of a portion above the storage medium after the moving speed is reduced, which is effective for preventing crash.

In the present invention, a head movement control method suitable for use in the above-described hard disk drive and data storing and reproducing device is provided. The head movement control method of the present invention controls a movement of a head, which reads and writes data, on a storage medium. The head movement control method comprises the steps of: outputting a control value regarding a moving speed of the head; and monitoring whether or not a new control value is outputted after the control value is outputted.

In the head movement control method of the present invention, the outputting state of the control value regarding the moving speed is monitored. When the output of a new control value is not confirmed within a predetermined period, it can be considered that abnormality is caused in the head movement control. In such a case, a head retract step is carried out to retract the head out of the portion above the storage medium on the assumption that the moving speed of the head is desirably reduced. In the abnormal state of the head movement control, it is effective for an assured retract operation that the head is retracted after the speed is once reduced because of the high moving speed of the head.

In the head movement control method of the present invention, the monitoring step is carried out in such a manner that a predetermined timeout value to be decreased by receiving a clock signal is set, and then it is monitored whether or not a new control value is generated until the timeout value reaches a predetermined value.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Next, description will be made for a specific aspect with regard to an example of a hard disk drive 1 according to the present invention.

Figure 1:
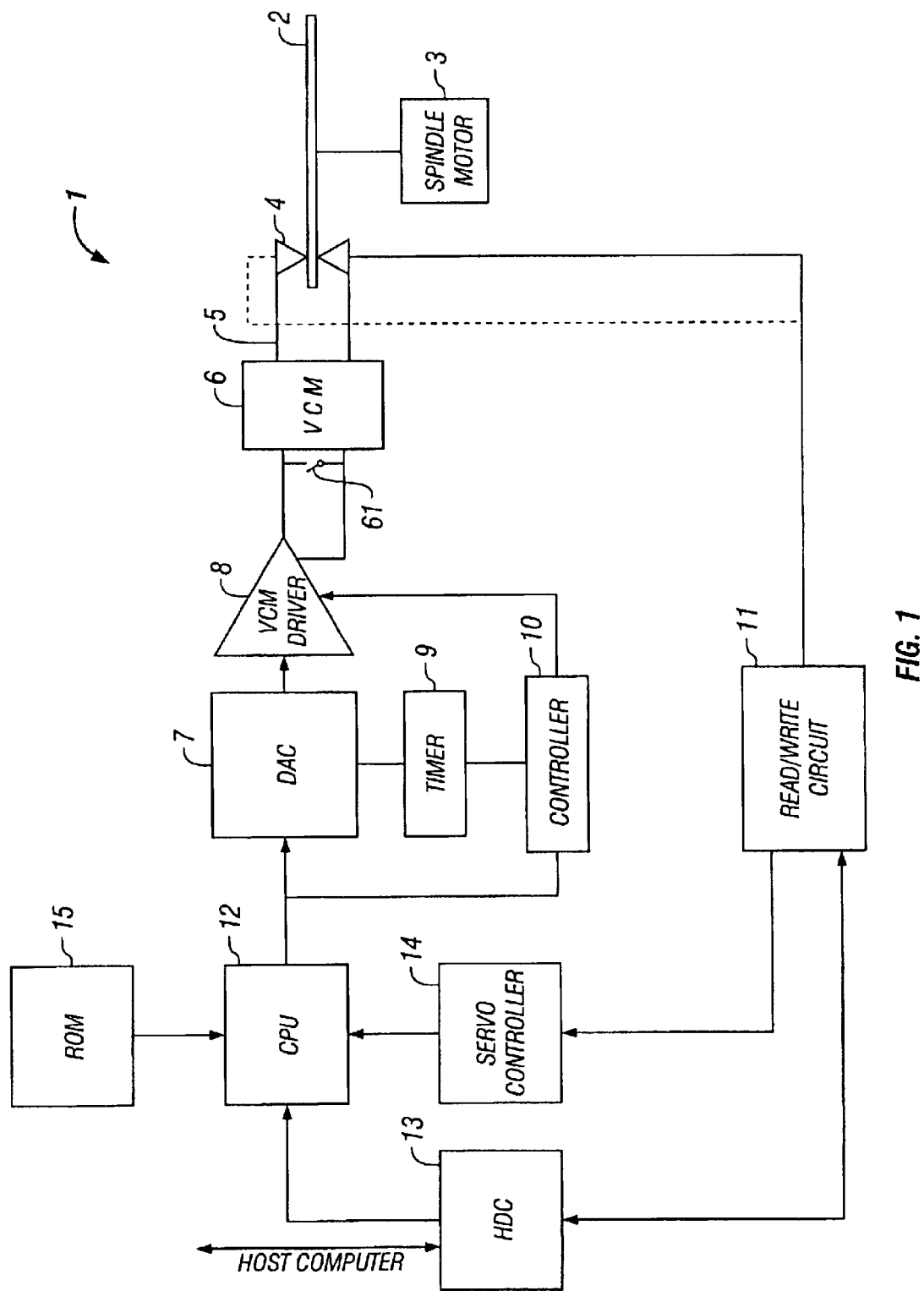
FIG. 1 is a block diagram showing a main portion of a hard disk drive according to an embodiment.

FIG. 1 is a block diagram showing a main portion of the hard disk drive 1. The hard disk drive 1 is a data storing and reproducing device, in which each of magnetic heads 4 seeks on a magnetic disk 2 rotatively driven by a spindle motor 3 and stays at a predetermined position to write data in the magnetic disk 2 or read data written in the magnetic disk 2. A single or a plurality of magnetic disks 2 are mounted in accordance with necessity, but an example using a single magnetic disk 2 is shown in the embodiment.

When the hard disk drive 1 is operating, the magnetic disk 2 is driven to rotate around a spindle shaft of the spindle motor 3, and when the hard disk drive 1 is not operating, the magnetic disk 2 is stops rotating (rests). On the surface of the magnetic disk 2, a plurality of position information (servo information) storage areas along a radial direction of the magnetic disk 2 are formed spokewise, and data storage areas are formed in other areas. The servo information is read by each of the magnetic heads 4, and then the position of each of the magnetic heads 4 can be known.

As described above, the servo information is composed of the track identification information and the burst pattern. The track identification information is information indicating a track address of each data track. By reading the track identification information with each of the magnetic heads 4, the current track position of the magnetic heads 4 can be determined. The burst pattern includes areas arranged at a constant interval in a radial direction of the magnetic disk 2, each area storing a signal, and is constituted of a plurality of signal storage area arrays, each having signal storage areas of different phases. The displacement amount of each of the magnetic heads 4 from the data track can be determined based on the signal outputted from the burst pattern.

Two magnetic heads 4 are held at tips of actuators 5 corresponding to the front and rear surfaces of the magnetic disk 2. The magnetic heads 4 carry out data reading and writing for the magnetic disk 2, and read the servo information stored in the magnetic disk 2. Each of the magnetic heads 4 is moved integrally with each of the actuators 5 in the radial direction of the magnetic disk 2. A ramp (not shown), at which each of the magnetic heads 4 is parked when not driven, is disposed outside the magnetic disk 2.

A read/write circuit 11 carries out data read/write processing. Specifically, the read/write circuit 11 converts write data transferred from a host computer via an HDC (hard disk controller) 13 to a write signal (current), and supplies the write signal to the magnetic heads 4. The magnetic heads 4 write data in the magnetic disk 2 based on the write current. Meanwhile, the read/write circuit 11 converts a read signal (current) read from the magnetic disk 2 into digital data, and outputs the digital data to the host computer via the HDC 13. The digital data includes the servo information.

A servo controller 14 extracts the servo information from the read data outputted from the read/write circuit 11. As described above, the servo information includes the track identification information and the burst pattern. The servo controller 14 transfers the extracted servo information to a central processing unit (CPU) 12.

The actuators 5 are driven by a voice coil motor (VCM) 6. In other words, the VCM 6 drives the magnetic heads 4. The VCM 6 is composed of a mover having a coil as an element and a stator having a permanent magnet as an element. The mover is driven by supplying a predetermined current from a VCM driver 8 to the coil, and thus the magnetic heads 4 are moved or stopped at the predetermined position on the magnetic disk 2.

The HDC 13 has functions as interface of the hard disk drive 1. In one of the functions, the HDC 13 receives write data transferred from the host computer and transfers the write data to the read/write circuit 11. Moreover, the HDC 13 transfers read data transferred from the read/write circuit 11 to the host computer. Furthermore, the HDC 13 receives a command or the like from the host computer and transfers it to the CPU 12.

The CPU 12 takes charge of controlling the hard disk drive 1. Therefore, the CPU 12 carries out moving of the magnetic heads 4, that is, speed control thereof. The CPU 12 interprets and executes a program stored in a read only memory (ROM) 15. The CPU 12 determines the position of each of the magnetic heads 4 based on the servo information transferred from the servo controller 14, and then outputs a speed control value of each of the magnetic heads 4 to a digital/analog converter (DAC) 7 based on a deviation between the determined position of each of the magnetic heads 4 and a target position. The speed control value as a moving command of the magnetic heads 4 is outputted each time when the servo information is read by the magnetic heads 4. Since the servo information is read at a predetermined interval in principle, the speed control value is originally outputted intermittently at a predetermined interval based on the servo information.

The DAC 7 converts the speed control value outputted from each of the magnetic heads 4 into an analog signal (voltage signal) and outputs the analog signal to the VCM driver 8.

The VCM driver 8 converts the voltage signal received from the DAC 7 into a driving current and supplies the driving current to the VCM 6.

A timer 9 sets a timeout value ($N=N_0$) each time the speed control value is outputted from the CPU 12. Accordingly, at the normal time, the timeout value is updated each time at a predetermined interval. The timeout value is decreased one by one at each time of generation of the clock signal. Specifically, after the timeout value is set (updated), the timeout value is decreased as $N=N_0-1$, $N=N_0-2$, $N=N_0-3$ . . . each time that the timer 9 receives the clock signal. Note that the timeout value is set so as to be more than 0 ($N>0$) until the timeout value is updated.

A controller 10 detects that the speed control value is outputted from the CPU 12 and monitors the timeout value of the timer 9.

The controller 10 monitors the timeout value. When the timeout value becomes less than 0 ($N<0$), the controller 10 sends a command to the VCM driver 8 to make a short circuit in the VCM 6 and to flow a brake current in the VCM 6.

Next, description will be made for operations of the hard disk drive 1 with reference to FIG. 2.

A write or read command is given from the host computer to the CPU 12 via the HDC 13. Then, the CPU 12 starts speed control for moving each of the magnetic heads 4 to a target track of the magnetic disk 2. Each of the magnetic heads 4 reads the servo information from the magnetic disk 2. The read servo information is transferred to the CPU 12 via the read/write circuit 11 and the servo controller 14. The CPU 12 outputs the speed control value based on the transferred servo information to the DAC 7. At this time, the timer 9 sets the timeout value ($N=N_0$) (S101 in FIG. 2).

Figure 2:
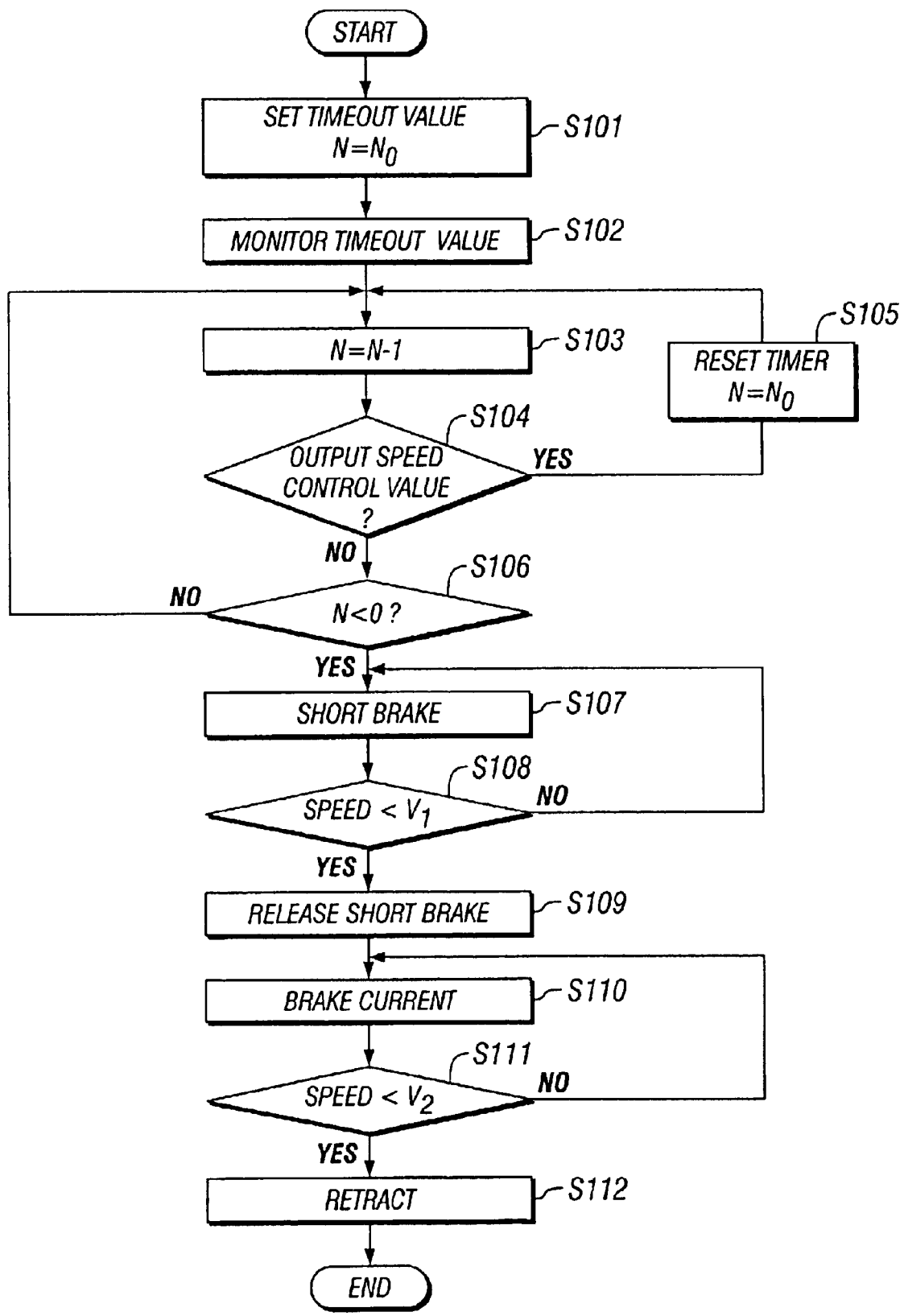
FIG. 2 is a flow chart showing operations of the hard disk drive according to the embodiment.

After the setting of the timeout value, the controller 10 monitors the timeout value (S102 in FIG. 2). The monitoring of the timeout value is equivalent to monitoring of an output timing or an output interval of the speed control value.

The timer 9 decreases the timeout value one by one at each time of receiving the clock signal (S103 in FIG. 2).

The controller 10 monitors the output of the speed control value from the CPU 12 (S104 in FIG. 2). On confirming the output of a new speed control value, the controller 10 resets the timeout value of the timer 9 (S105 in FIG. 2). Meanwhile, when the controller 10 does not confirm the output of the new speed control value, the controller 10 judges whether or not the timeout value of the timer 9 is less than 0 (S106 in FIG. 2). When the timeout value is not less than 0 ($N<0$), the procedure is returned to S103.

The timeout value of the timer 9 less than 0 ($N<0$) means that the output interval of the speed control value exceeds the predetermined interval of the normal operation. In other words, the timeout value less than 0 indicates that the output timing of the new speed control value is shifted from the normal timing by a predetermined amount, and the speed control of each of the magnetic heads 4 is considered to be impossible. The magnetic heads 4 are highly likely to be in a runaway state because the speed control is impossible. Accordingly, the speed control by the CPU 12 is changed to a predetermined speed control for coping with the runaway state. Such predetermined speed control is designed to protect the magnetic heads 4 from the runaway.

In the predetermined speed control, a short circuit is first made in the VCM 6, specifically, in the output portion thereof. Energy in the mover of the VCM 6 is instantaneously decreased with a large current generated by the short circuit. Therefore, such a short brake can reduce the speed of each of the magnetic heads 4 even when each of the magnetic heads 4 is moved at high speed (S107 in FIG. 2). In order to operate the short brake, the VCM 6 may be provided with a short circuit switch 61.

After the operation of the short brake, the short circuit of the VCM 6 is released. The VCM driver 8 detects a voltage generated by a counter electromotive force of the VCM 6. Since the voltage is proportional to a driving speed of the VCM 6, the driving speed of the VCM 6, that is, the moving speed of the magnetic heads 4 can be detected. The controller 10 judges whether or not the detected moving speed is less than $V_1$ (S108 in FIG. 2). When the moving speed is not less than $V_1$, the short brake is kept operating (S108, S107 in FIG. 2).

On the other hand, when the moving speed is less than $V_1$, the short brake is released (S109 in FIG. 2). Subsequently, the controller 10 sends a command to the VCM driver 8 to supply a brake current to each of the magnetic heads 4. The VCM driver 8 supplies the brake current to the VCM 6 (S110 in FIG. 2). The brake current is determined in accordance with the detected speed. For example, the controller 10 has a table describing a brake current corresponding to the detected speed, making it possible to set the brake current. Note that the detected speed is a value including a moving direction.

The controller 10 detects whether or not the moving speed of each of the magnetic heads 4 reaches $v_2$ (S111 in FIG. 2). The brake current is supplied to each of the magnetic heads 4 until the moving speed thereof reaches $v_2$. When the moving speed of each of the magnetic heads 4 reaches $v_2$, retract is carried out (S112 in FIG. 2). The retract is an operation of retracting the magnetic heads 4 to the ramp (not shown) provided outside the magnetic disk 2. Each of the magnetic heads 4 is moved to the ramp, that is, the retracted position previously provided, thus finishing the series of the operations.

Figure 3:
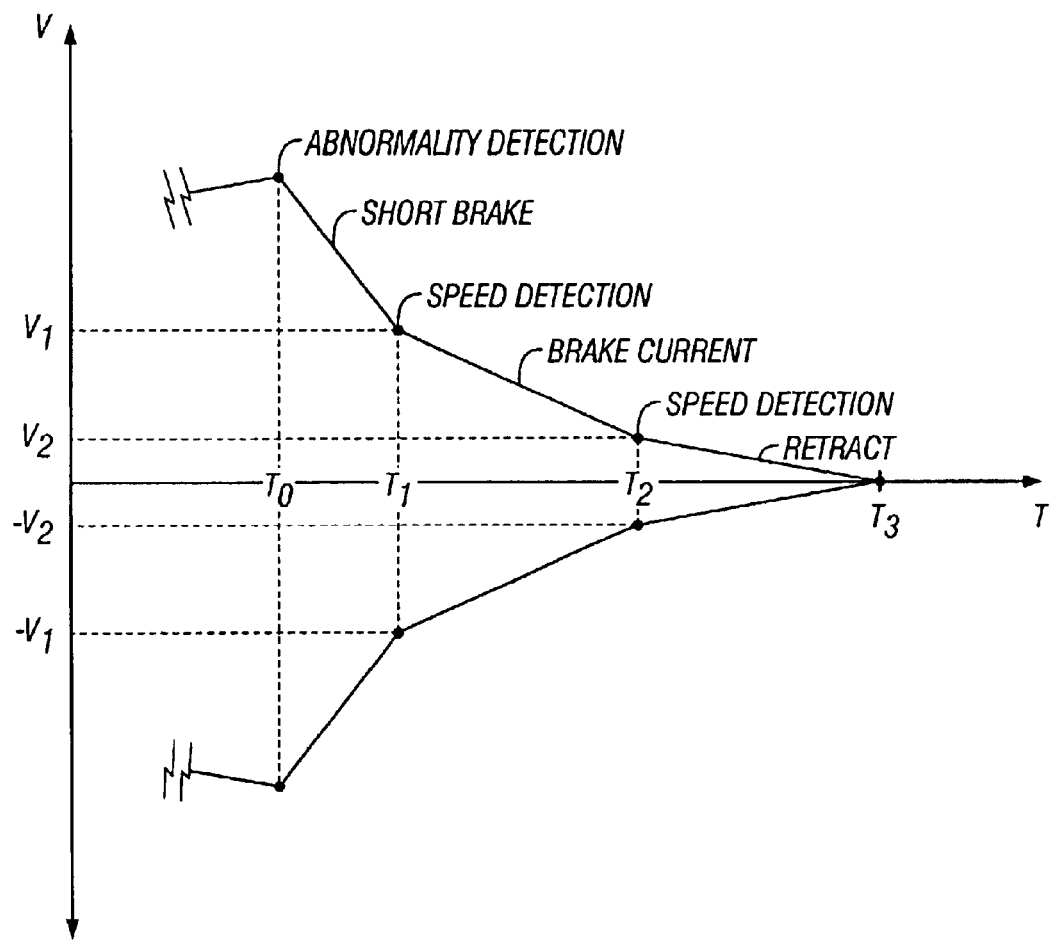
FIG. 3 is a graph showing change in a head moving speed in the case that runaway occurs in the hard disk drive according to the embodiment.

FIG. 3 is a graph conceptually showing change in the moving speed of each of the magnetic heads 4 after the timeout value is judged to be less than 0 ($N<0$) in S106 of FIG. 2.

In FIG. 3, the time when the timeout value is judged to be less than 0 ($N<0$), in other words, the time when the timer 9 and the controller 10 detect that the abnormality is caused in the movement control of each of the magnetic heads 4 is set at $t_0$. Since the short brake is operated as described above, the moving speed is reduced. The short brake is operated until $t_1$, and the moving speed is reduced to $v_1$. Then, the moving speed is further reduced by supplying the brake current. When it is detected that the moving speed becomes $v_2$, the moving speed is further reduced as the retracting operation is carried out. When each of the magnetic heads 4 is held by the ramp, the moving speed thereof becomes 0. Note that, since the moving speed is a value having a moving direction of the magnetic heads 4, positive (+) and negative (−) speeds are shown in FIG. 3. One of the speeds indicates a moving speed toward the center of the magnetic disk 2, and the other indicates a moving speed toward the outer circumference of the magnetic disk 2.

In the embodiment, the step-by-step speed reduction is carried out by the short brake and the brake current before the retract operation. The speed reduction by the short brake is carried out to reduce the moving speed of each of the magnetic heads 4 to a speed capable of controlling the VCM 6 by use of the driving current and to detect the moving speed. After the reduction of the speed by the short brake, the brake current is supplied to reduce the moving speed of each of the magnetic heads 4 to a speed capable of the retract operation. However, in the present invention, both of such two controls for the speed reduction are not essential, and any one of the controls may be used.

As described above, in the embodiment, the output interval of the speed control value outputted from the CPU 12 is detected. When the output interval exceeds the predetermined period, the movement control of the magnetic heads 4 is changed from a control by the CPU 12 into a control by the controller 10. The changed control includes the step-by-step reduction of the moving speed for the purpose of protecting the magnetic heads 4 and the subsequent retract operation. The output timing of the speed control value is shifted by the various kinds of factors such as a noise current, a defect in a servo logic circuit, and a software bug. Therefore, the embodiment can properly cope with the runaway of the magnetic heads 4, which can be caused by such various kinds of factors.

In the embodiment, the timer 9 and the controller 10 are provided for the DAC 7. Since the DAC 7 and the VCM driver 8 are analog circuits and has relatively low operation frequencies, there is an advantage that the timer 9 and the controller 10 are not susceptible to noise.

As described above, according to the present invention, damage of the head or the periphery thereof caused by the runaway of the head can be suppressed. Furthermore, the present invention can cope with the various kinds of factors causing the runaway.

Although the preferred embodiment of the present invention has been described in detail, it should be understood that various changes, substitutions and alternations can be made therein without departing from spirit and scope of the inventions as defined by the appended claims.

What is claimed is:

1. A hard disk drive, comprising:
   a magnetic disk having servo information stored thereon;
   a magnetic head;
   an actuator;
   a voice coil motor coupled with said actuator to move said magnetic head to a predetermined position relative to said magnetic disk; and
   a position controller supplying a driving current to said voice coil motor based on servo information read by said magnetic head, wherein said position controller includes: an output unit outputting a speed control value based on the servo information; a converter converting the speed control value into the driving current; a monitoring unit monitoring an output timing of the speed control value; and a driving speed controller limiting a driving speed of said voice coil motor in a case that the output timing of the speed control value is shifted by an amount not less than a predetermined amount,
   wherein said driving speed controller limits the driving speed of said voice coil motor by making a short circuit in said voice coil motor.

2. The hard disk drive according to claim 1, wherein said driving speed controller limits the driving speed of said voice coil motor by supplying a brake current to said voice coil motor.

3. The hard disk drive according to claim 1, wherein said driving speed controller limits the driving speed of said voice coil motor by supplying a brake current to said voice coil motor after a short circuit is made in said voice coil motor.

4. A data storing and reproducing device, comprising:
   a storage medium;
   a magnetic head;
   an actuator coupled with said head to move said head to a predetermined position of said storage medium;
   an output unit intermittently outputting a moving command to said actuator; and
   a detector for detecting a generation interval of the moving command, and further including
   a controller controlling a speed of said actuator to be reduced in a case that an output interval of the moving command exceeds a predetermined value.

5. The data storing and reproducing device according to claim 4, wherein said controller controls the speed of said actuator to be reduced step-by-step.

6. The data storing and reproducing device according to claim 4, wherein said controller controls said actuator to be moved to a retracted position after the speed of said actuator is reduced to a predetermined speed, the retracted position being previously provided.

7. A head movement control method for controlling a movement of a head on a storage medium, comprising the steps of;
   outputting a control value regarding a moving speed of the head;
   monitoring whether or not a new control value is outputted for a predetermined period after the control value is outputted; and,
   retracting the head out of a portion above the storage medium when an output of the new control value is not confirmed within the predetermined period in said monitoring step.

8. The head movement control method according to claim 7, wherein the head is retracted out of the portion above the storage medium after the moving speed of the head is reduced in said head retract step.

9. The head movement control method according to claim 7, wherein a predetermined timeout value, which is decreased by receiving a clock signal, is set, and then it is monitored whether or not a new output value is outputted until the timeout value reaches a predetermined value in said monitoring step.

* * * * *